United States Patent [19]

Mimura

[11] Patent Number: 4,703,771
[45] Date of Patent: Nov. 3, 1987

[54] VEHICLE FUEL TANK
[75] Inventor: Etuhisa Mimura, Susono, Japan
[73] Assignee: Toyota Jidosha Kabushiki Kaisha, Toyota, Japan
[21] Appl. No.: 888,512
[22] Filed: Jul. 23, 1986
[30] Foreign Application Priority Data Sep. 13, 1985 [JP] Japan .................... 60-139527[U]

[51] Int. Cl.$^4$ ............................................. F04F 10/00
[52] U.S. Cl. .................................... 137/142; 137/571; 137/574; 137/590; 280/5 H
[58] Field of Search ............... 137/142, 571, 574, 590; 280/5 H

[56] References Cited

U.S. PATENT DOCUMENTS 3,021,855  2/1962  Cartwright et al. ............ 137/142 X
3,083,720  4/1963  Cartwright et al. ............ 137/151 X
4,579,139  4/1986  Stouffer ............................. 137/142

FOREIGN PATENT DOCUMENTS 53123  4/1984  Japan .

Primary Examiner—Gerald A. Michalsky
Attorney, Agent, or Firm—Finnegan, Henderson, Farabow, Garrett and Dunner

[57] ABSTRACT

A vehicle fuel tank in which the tank bottom has a protrusion so as to provide a space for accommodating the frame and other parts of the vehicle under the fuel tank, the protrusion defining a plurality of compartments in the fuel tank. An overhanging siphon having an opening in the top thereof provides communication between compartments. A fuel inlet pipe and a fuel suction pipe are communicated with a first compartment so that the supply of fuel into the fuel tank and the suction of fuel from the fuel tank are conducted through the first compartment. A valve such as a float valve is provided on the siphon opening.

9 Claims, 10 Drawing Figures

VEHICLE FUEL TANK

BACKGROUND OF THE INVENTION

Field of the Invention

The present invention relates to the field of fuel tank construction for automotive engines.

Description of the Related Art

As is well known, automobiles are equipped with fuel tanks for storing fuel to be fed to the engines. Long trips are now popular with the spread of express highways, so that large-capacity automotive fuel tanks are required to prevent running out of fuel which may occur during extensive touring.

On the other hand, there is a demand for reduction in size of the automobile as a whole, so that the large-sized fuel tank may cause interference with other parts of the frame. Further, it is quite difficult to give the first priority to the fuel tank in designing an automobile. In consequence, automotive fuel tanks usually cannot have plane side surfaces, and the bottoms are usually convexed and concaved largely in order to permit mounting of other automotive parts. Thus, in many cases, fuel tanks have two or more deep wells or compartments.

For instance, a fuel tank 1 shown in FIG. 1 has two wells 2, 3 which are separated from each other by a recess 4 along the tank bottom, the recess 4 being formed in order to provide a space for the automotive frame or other parts. Singular inlet tube 5, main tube 6 and return tube 7 are arranged in a manner to simplify the construction as much as possible. In order to enable the fuel to be supplied to the engine through a single main tube 6 after the fuel level 8 has come down below the level of the top of the recess 4, the compartments 2 and 3 are communicated with each other through an underhanging tube 9 which serves as a communication tube.

In the fuel tank 1, however, since two compartments 2, 3 are communicated with each other through the underhanging tube 9, the tube 9 tends to interfere with other constituent parts of the vehicle such as the frame or other equipment, thus making the provision of two compartments separated by the recess 4 meaningless. In consequence, the degree of freedom for the installation of the fuel tank 1 is undesirably reduced.

It would be possible to arrange the tube 9 such that it extends below the frame and other equipment. Such an arrangement, however, increases the protective maintenance requirements.

In order to overcome this problem, Japanese Utility Model Laid-Open No. 53123/1984 proposes an arrangement in which an overhanging, i.e., upwardly convexed, siphon is provided between two compartments, with a float attached to the inlet of the siphon. This arrangement, however, necessitates valves for respective openings of the siphon, so that the construction is complicated and protective maintenance work is rendered troublesome, resulting in increased cost of production.

SUMMARY OF THE INVENTION

Accordingly, it is a primary object of the invention to overcome the above-described problems of the known fuel tanks which are divided into compartments.

Another object of the invention is to provide a vehicle fuel tank which is simple in construction and easy to manufacture with minimized risk of trouble, thus contributing to the field of traffic industry which utilizes fuel.

It is another object to provide a vehicle fuel tank in which the fuel tank is divided into a plurality of compartments for the purpose of elimination of interference with the frame and other equipment, thus contributing the reduction in the vehicle size, in which an overhang type siphon provides sufficient communication between the lowermost compartment and higher compartment for allowing effective use of the fuel.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To achieve the objects and in accordance with the purpose of the invention, as embodied and as broadly described herein, a vehicle fuel tank is provided, comprising walls, a top and a bottom. A protrusion in the bottom defines a plurality of compartments in the tank. Inlet means for directing fuel into a first one of the compartments and section means for removing fuel from a first one of the compartments are provided. A siphon having an opening in the first and a second of the compartments has a priming means for priming the siphon. The priming means is governed by the level of fuel in the tank so as to transfer fuel to the first compartment at times when the fuel level in the first compartment is below the level in the second compartment.

The accompanying drawings, which are incorporated in and constitute a part of this specification, illustrate presently preferred embodiments of the invention and, together with the description, serve to explain the principles of the invention.

DESCRIPTION OF THE PREFERRED EMBODIMENTS

Figure 1:
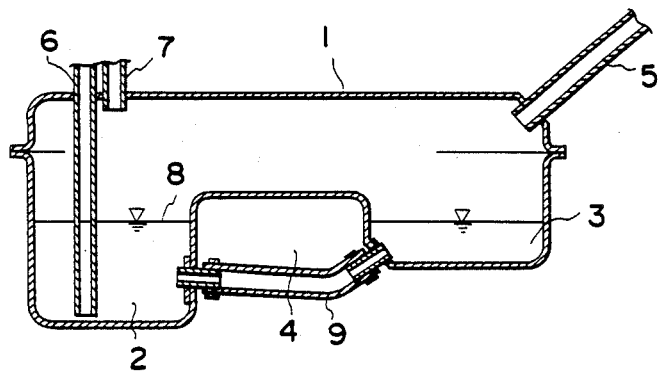
FIG. 1 is a sectional view of a conventional vehicle fuel tank.

Reference will now be made in detail to several embodiments of the invention, examples of which are illustrated in the accompanying drawings. Throughout the drawings, like reference characters are used to designate like elements.

Figure 2:
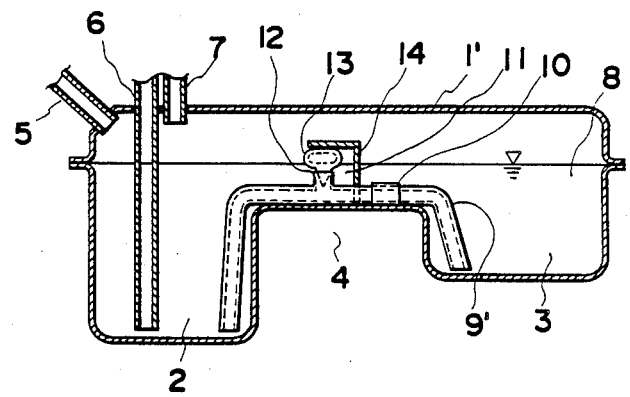
FIG. 2 is a sectional view of a fuel tank according to a first embodiment of the present invention.
Figure 3:
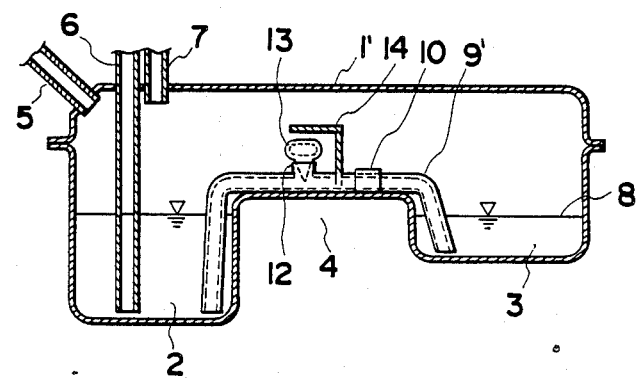
FIG. 3 is a sectional view of the fuel tank shown in FIG. 2 with lowered fuel level.
Figure 4:
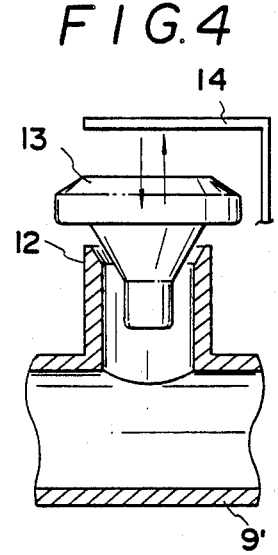
FIG. 4 is a fragmentary sectional view of the fuel tank shown in FIG. 2.

FIGS. 2 to 4 show a fuel tank generally designated by a numeral 1'. The fuel tank 1' is situated under a trunk space or under the passenger's compartment. As stated before, the bottom of the fuel tank 1' is recessed as at 4 so as to permit the installation of the frame and other equipment, thus providing two compartments 2 and 3 of different depths or levels which are demarcated by the protrusion corresponding to the recess 4. An inlet pipe 5 and a main tube 6 communicating with the float chamber of the engine (not shown) and a return pipe 7 are connected to one side of the fuel tank 1'. The fuel 8 is supplied through the inlet pipe 5 and is directed into the compartment 2 so as to fill the fuel tank. As the fuel level is raised above the protrusion corresponding to the recess 4, both compartments 2 and 3 are filled up to an equal level.

An overhanging siphon 9' has two ends respectively confronting the bottoms of the compartments 2 and 3 having different bottom levels. A substantially flat top portion of the siphon extends along the top surface of the protrusion corresponding to the recess 4 and is fixed to the protrusion by means of a bracket 10 and the siphon then extends downwardly into compartments 2 and 3, respectively, to form a generally inverted U-shaped configuration.

An upwardly directed opening 12 is provided on the top of siphon 9'. A float having a specific weight which is small enough to cause a sufficient buoyancy confronts the opening 12. The arrangement is such that, when the level of the fuel 8 is above the opening 12, the float 13 floats to open the opening 12, whereas, when the fuel level is below the opening 12, the float comes down to block the opening 12. An L-shaped stopper 14 provided over the siphon 9' has such a height as to limit the stroke of the float 13, thus preventing the latter from coming off.

Thus, the float 13 is movable in accordance with the fuel level between a first position where it blocks the opening 12 and a position where it is stopped by the stopper 14.

Therefore, when the level of the fuel 8 has come down below the opening 12, the float 13 blocks the opening 12 and the fuel fills the siphon 9' which provides communication between the two compartments 2 and 3, whereby the fuel is supplied to the bottom of the lower compartment 2 until the higher compartment 3 becomes empty. When the higher compartment 3 has become empty, air comes into the siphon 9', so that the higher compartment is drained completely.

Thereafter, the fuel remains only in the lower compartment 2, so that the fuel is supplied through the compartment 2 only through the main tube 6.

As the fuel 8 is poured into the fuel tank 1 through the inlet pipe 5, the level of the fuel 8 is gradually raised and, after the level has exceeded the level of the protrusion corresponding to the recess, the fuel is directed only into the higher compartment 3. As the level of the fuel 8 is further raised to reach the level of the opening 12, the float 13 leaves the opening 12 and comes into contact with the stopper 14. In consequence, the opening 12 is opened to permit the siphon 9' to be filled up with the fuel 8. In this state, no air void exists in the siphon 9'. Any air voids remaining in the siphon 9' are relieved through the opening 12.

As the fuel tank is filled up with the fuel, fuel is supplied to the float chamber of the engine (not shown), while the return pipe 7 permits the fuel to return.

As time elapses, the fuel 8 in the fuel tank 1' is gradually consumed so that the fuel level comes down correspondingly. After the fuel level has come down to the same level as the float 13, the float 13 falls together with the fuel level, so as to block the opening 12. As the fuel level further comes down, the float loses its buoyancy and tightly closes the opening 12. In this state, compartments 2 and 3 are communicated with the siphon 9' which is filled with the fuel 8, and the fuel level further descends in accordance with the consumption of the fuel.

Even after the fuel level has come down below the level of the protrusion which separates compartments 2 and 3, the fuel is supplied from the higher compartment 3 into the lower compartment 2, through the siphon 9' which provides communication between the compartments, so that the supply of the fuel to the float chamber of the engine is continued.

After the consumption of the fuel 8 in the higher compartment 3 is completed, the siphon 9' sucks air so that air voids are introduced into the lower compartment 2. In this state, the siphon 9' loses its siphoning function, but the supply of the fuel 8 through the main tube 6 is continued because in this state fuel still remains in the lower compartment 2.

It is thus possible to supply the fuel until the fuel tank 1' becomes empty. When empty, the fuel tank 1' can be refilled with the fuel 8 through the inlet pipe 5.

If the refilling is stopped while the fuel level is still below the protrusion of the recess 4, the fuel resides only in the lower compartment, so that the presence or absence of the siphon 9' does not matter materially.

However, when the refilling is stopped after the fuel level has exceeded the level of the opening on the top of the siphon 9', the float 13 functions again because the siphon 9' has been filled with fuel 8.

Figure 5:
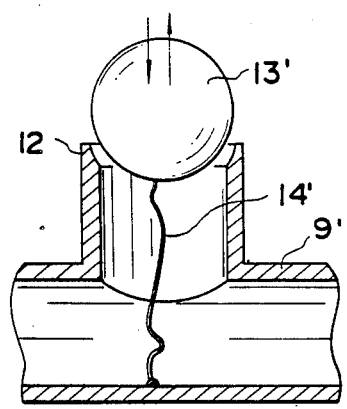
FIG. 5 is a fragmentary sectional view corresponding to FIG. 4 but showing another embodiment of the invention.
Figure 6:
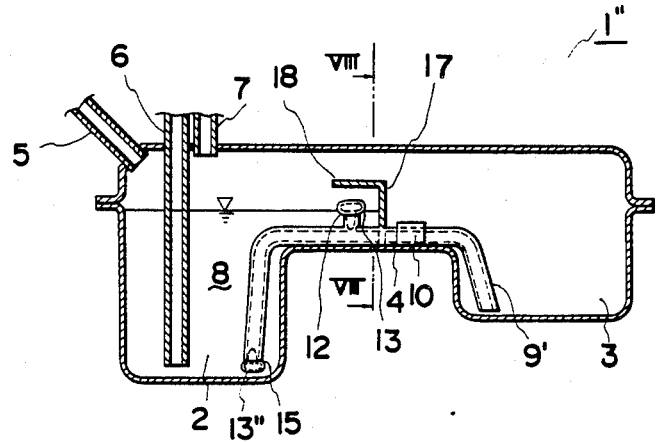
FIG. 6 is a sectional view of a fuel tank according to another embodiment of the invention.

FIG. 5 shows an embodiment which has a construction simpler than the embodiment shown in FIG. 4. Namely, in this embodiment, a stopper cord 14', connected between the float 13' and the siphon 9', replaces the stopper 14. The operation and effect of this embodiment are materially identical to those of the embodiment shown in FIG. 4.

FIGS. 6 to 10 show another embodiment of the invention in which the fuel tank 1" has compartments 2, 3 separated by a protrusion corresponding to the recess 4 in the center of the lower side thereof. The inlet pipe 5, main tube 6 and return tube 7 are connected to the upper side of the compartment 2. The main tube 6 is extended to a level near the bottom of the compartment 2, so that it can suck up the fuel almost completely. An overhang type siphon 9' is fixed to the top of the protrusion corresponding to the recess 4 by means of a bracket 10. The siphon 9' has both ends confronting the bottom surfaces of the compartments 2 and 3 and a substantially flat top portion which extends along the top of the protrusion corresponding to the recess 4.

The top of the siphon 9' has an upwardly directed opening 12 to which a float 13, having a sufficient buoyancy to float in the fuel 8, is fitted from the upper side of the opening 12. When the level of the fuel 8 is high, the float 13 floats above the opening 12 so as to open the opening 12, whereas, when the level of the fuel 8 is low, it blocks the opening 12 by its weight.

Figure 7:
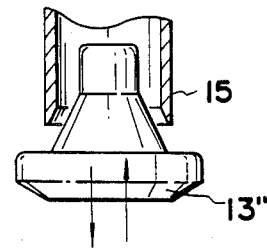
FIG. 7 is a fragmentary sectional view showing an end of the siphon and the float of FIG. 6.

As shown in detail in FIG. 7, a float 13" having a predetermined buoyancy is adapted to fit in the opening 15 of the siphon 9' in the compartment 2. When the fuel 8 exists only in the compartment 2, the float 13" blocks the opening 15. When the fuel 8 is being sucked through the main tube 6 from the compartment 2 which is filled, the float 13" is opened by fuel passing from the compartment 3 to the compartment 2 due to the suction from the suction tube 6, thereby opening the opening 15.

Figure 8:
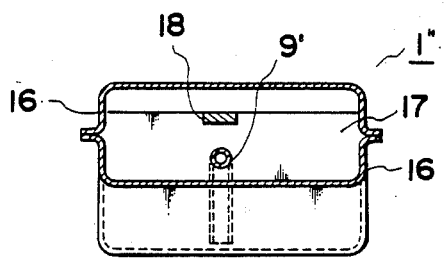
FIG. 8 is a sectional view taken along the line VIII—VIII of FIG. 6.

A dam 17 is formed on the top of the protrusion corresponding to the recess 4 in the fuel tank 1" so as to extend between both side walls 16, 16 of the fuel tank 1" as shown in FIG. 8. The siphon 9' is extended through the lower end portion of the dam 17. The siphon 9', the protrusion of the recess 4 and both side walls 16, 16 are assembled in a liquid-tight manner, and the height of the dam 17 is higher than the level of the opening 12 of the siphon 9'. A stopper 18 is extended from the upper end of the dam 17, so as to limit the vertical stroke of the float 13.

According to this arrangement, as the fuel 8 flows into the fuel tank 1" through the inlet pipe 5, the fuel level is gradually raised. The opening 15 of the siphon 9' in the compartment 2 is kept closed by the buoyancy of the float 13". The opening 12 in the top of the siphon 9' also is kept closed b the float 13 due to its weight until the fuel level reaches the level of the opening 12 in the top of the siphon 9'. At the same time, because the dam 17 is higher than the top opening 12, the fuel 8, supplied through the inlet pipe, fills only the compartment 2 and is not directed into the compartment 3 as will be seen from FIG. 6.

When the supply of the fuel 8 is stopped and the sucking of the fuel through the suction tube 6 is commenced, the fuel 8 stored in the compartment 2 is effectively sucked up until the fuel tank 1" becomes empty.

Figure 9:
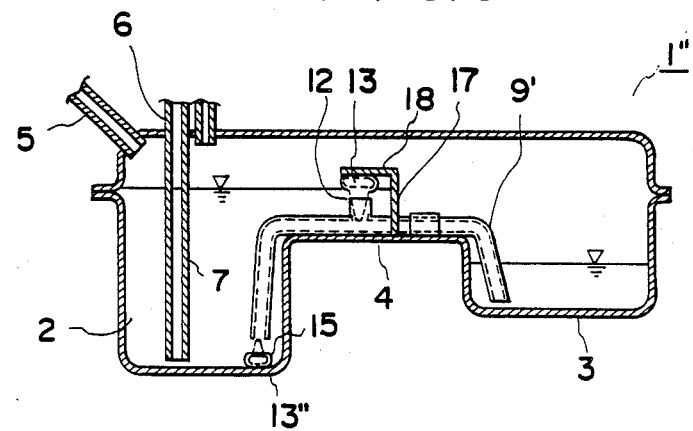
FIG. 9 is a sectional view of the fuel tank in a fueling condition according to the embodiment of FIG. 6.
Figure 10:
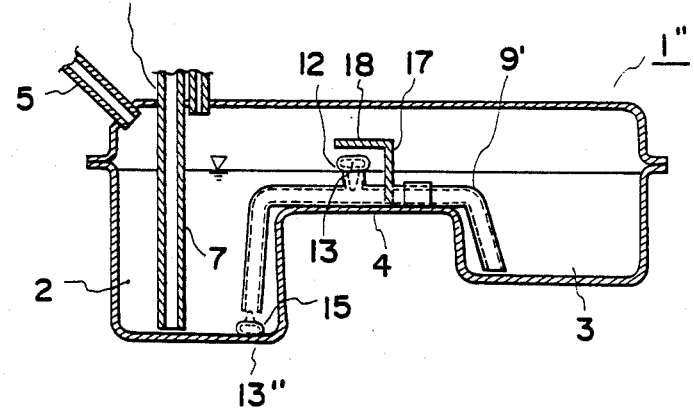
FIG. 10 is a sectional view of the fuel tank in a fuel utilizing condition according to the embodiment of FIG. 6.

On the other hand, if the fuel 8 is supplied to the level above the top opening 12 in the siphon 9', the float 13 floats to leave the opening 12 due to its buoyancy as shown in FIG. 9, so that the opening 12 is opened. As a result, the siphon 9' is filled with the fuel, so that the fuel flows from the lower compartment 2 to the higher compartment 3 through the siphon 9'. When the supply of fuel 8 is stopped in this state and the fuel is sucked through the main tube 6 in response to the start of the engine, the float 13" is displaced downwardly by the suction force exerted through the main tube 6, so that the opening 15 of the siphon 9' in the compartment 2 is opened, whereby the fuel flows into the siphon 9' so as to completely expel the stagnant air in the siphon 9'. Then, as the level of the fuel 8 is lowered to the level of the top opening 12 in the siphon 9' as a result of the suck up of the fuel through the main tube 6, the float 13 closes the opening 12 by its weight as shown in FIG. 10. As the fuel is further sucked up through the main tube 6, the fuel is induced from the compartment 3 into the compartment 2 through the siphon 9'. In consequence, the fuel in the compartment 2 and the fuel in the compartment 3 are sucked up almost simultaneously and the fuel level in the compartments 2 and 3 remains substantially the same.

It will be understood that the described embodiments are only illustrative and various changes and modifications may be imparted thereto. For instance, the siphon can be formed by making an efficient use of the thick-walled portion of the protrusion corresponding to the recess 4, and a switch may be provided between the float and the opening. The invention in its broader respects is, therefore, not limited to the specific details, representative methods and apparatus, and illustrative examples shown and described hereinabove. Thus, it is intended that all matter contained in the foregoing description or shown in the accompanying drawings shall be interpreted as illustrative and not in a limiting sense.

What is claimed is:

1. A vehicle fuel tank, comprising:
   a top, sidewalls, and a bottom;
   said bottom having a protrusion extending upwardly in the tank, said protrusion defining a plurality of compartments;
   inlet means for supplying fuel to said tank;
   suction means having an opening adjacent the bottom of the tank in a first of said compartments;
   a siphon tube provided entirely inside the tank having a first end open adjacent the bottom of said tank in said first compartment and having a second end open adjacent the bottom of said tank in a second of said compartments, said siphon tube being so disposed for siphoning fuel from said second compartment to said first compartment at times when said tube is devoid of air and the level of fuel in said first compartment is below the fuel level in said second compartment; and
   a float valve intermediate said first and second open ends for permitting elimination of air from said siphon tube when fuel in the tank is above a predetermined level, and for preventing air from entering said tube when fuel in the tank is below said predetermined level while said siphon tube first and second open ends are surmerged in fuel, said float valve including a valve opening in said siphon tube above said protrusion for priming said siphon.

2. A vehicle fuel tank, comprising:
   walls, a top and a bottom;
   a protrusion in said bottom, said protrusion defining a plurality of compartments in said tank;
   inlet means for directing fuel into a first one of said compartments;
   suction means for removing fuel from said first one of said compartments;
   a siphon having an inverted U-shaped configuration, having a first open end in said first compartment and a second open end in a second of said compartments, said first and second open ends being formed proximate the bottoms of said first and second compartments, respectively, said siphon including a valve having an opening formed in the top of said siphon intermediate said first and second open ends of said siphon, said valve being operative to be selectively closed in accordance with the level of fuel in the tank and being operative for priming said siphon to transfer fuel to said first compartment at times when the fuel level in said first compartment is below the fuel level in said second compartment.

3. A vehicle fuel tank according to claim 2, wherein said valve is a float valve having a float member operative to close said valve opening in said siphon when the level of fuel in the tank is below the level of said valve opening.

4. A vehicle fuel tank according to claim 3, wherein said float valve includes a stopper plate for limiting the stroke of said float member, said stopper plate being connected to said tank bottom and fixed above said valve opening.

5. A vehicle fuel tank according to claim 3, wherein said float valve includes a stopper cord connected to said float member and said siphon for limiting the stroke of said float member.

6. A vehicle fuel tank according to claim 2 wherein said tank further comprises a dam attached to said protrusion and walls, said dam having an upper edge spaced from the top of said tank, said dam increasing the depth of each said compartment; and wherein said valve opening opens into said first compartment and is disposed below the top of said dam.

7. A vehicle fuel tank according to claim 6 further comprising valve means adjacent one end of the siphon for opening said one end only at times when fuel is being siphoned from said second compartment to said first compartment.

8. A vehicle fuel tank according to claim 6, wherein said valve is a float valve having a float member operative to close said opening in said siphon when the level of fuel in said first compartment is below the level of said valve opening.

9. A vehicle fuel tank according to claim 8, further comprising stopping means for limiting the upper limit of the stroke of said float member to a point below the upper edge of said dam.

* * * * *